(12) United States Patent
DePaula et al.

(10) Patent No.: US 8,469,271 B2
(45) Date of Patent: Jun. 25, 2013

(54) ELECTRONIC STORAGE DEVICES, PROGRAMMING METHODS, AND DEVICE MANUFACTURING METHODS

(75) Inventors: Andrew DePaula, Spokane, WA (US); Larry Aamodt, College Place, WA (US); Ronald Vyhmeister, Yucaipa, CA (US)

(73) Assignee: intelliPaper, LLC, Spokane, WA (US)

( * ) Notice: Subject to any disclaimer, the term of this patent is extended or adjusted under 35 U.S.C. 154(b) by 0 days.

(21) Appl. No.: 13/082,380

(22) Filed: Apr. 7, 2011

(65) Prior Publication Data
US 2012/0145797 A1  Jun. 14, 2012

Related U.S. Application Data

(63) Continuation-in-part of application No. 12/604,300, filed on Oct. 22, 2009, now Pat. No. 8,047,443, and a continuation-in-part of application No. 13/080,830, filed on Apr. 6, 2011.

(60) Provisional application No. 61/321,779, filed on Apr. 7, 2010, provisional application No. 61/321,801, filed on Apr. 7, 2010.

(51) Int. Cl.
*G06K 7/00* (2006.01)
(52) U.S. Cl.
USPC ............................... 235/435; 235/492
(58) Field of Classification Search
USPC .................................. 235/435, 492
See application file for complete search history.

(56) References Cited

U.S. PATENT DOCUMENTS

| | | |
|---|---|---|
| D267,009 S | 11/1982 | Doi |
| 4,780,603 A | 10/1988 | Hamada |
| 4,849,617 A | 7/1989 | Ueda |
| 4,850,105 A | 7/1989 | Nakajima et al. |
| 5,004,899 A | 4/1991 | Ueda |

(Continued)

FOREIGN PATENT DOCUMENTS

| | | |
|---|---|---|
| DE | 19601358 | 7/1996 |
| EP | 1798732 A1 | 6/2007 |

(Continued)

OTHER PUBLICATIONS

Sony Press Release; "TOPPAN and Sony Successfully Develop 25GB Paper Disc"; Apr. 15, 2004; www.sony.net/SonyInfo/News/Press_Archive/2004/04-15E/; 2pp.

(Continued)

*Primary Examiner* — Kristy A Haupt
(74) *Attorney, Agent, or Firm* — Wells St. John P.S.

(57) ABSTRACT

Electronic storage devices include one or more substrates, storage circuitry configured to store electronic data and communication circuitry configured to receive the electronic data from a programming device and provide the electronic data to the storage circuitry. The storage circuitry and communication circuitry are embedded in and are in direct physical contact with the one or more substrates. Programming methods include providing an electronic storage device comprising storage circuitry configured to store electronic data and communication circuitry configured to receive the electronic data and provide the electronic data to the storage circuitry, the storage circuitry and communication circuitry being embedded in two or more substrates. The methods also include communicating the electronic data to the communication circuitry and storing the electronic data in the storage circuitry.

21 Claims, 6 Drawing Sheets

U.S. PATENT DOCUMENTS

| | | |
|---|---|---|
| D320,225 S | 9/1991 | Ido et al. |
| 5,710,421 A | 1/1998 | Kokubu |
| 5,818,030 A | 10/1998 | Reyes |
| 5,888,624 A | 3/1999 | Haghiri et al. |
| 6,097,605 A | 8/2000 | Klatt et al. |
| 6,109,939 A | 8/2000 | Kondo et al. |
| 6,333,854 B1 | 12/2001 | Sasaoka et al. |
| D452,865 S | 1/2002 | Wallace et al. |
| 6,341,728 B1 | 1/2002 | Kondo et al. |
| D458,935 S | 6/2002 | Hiroki |
| 6,480,390 B2 | 11/2002 | Matsumiya et al. |
| 6,531,775 B1 | 3/2003 | Kobayashi et al. |
| 6,547,151 B1 | 4/2003 | Baldi |
| 6,567,273 B1 | 5/2003 | Liu et al. |
| 6,580,615 B1 | 6/2003 | Nakanishi et al. |
| 6,665,201 B1 | 12/2003 | Spencer et al. |
| D487,458 S | 3/2004 | Gentil et al. |
| 6,699,053 B2 | 3/2004 | Kuroda |
| 6,700,788 B2 | 3/2004 | Matsushita et al. |
| 6,735,656 B2 | 5/2004 | Hanke et al. |
| D490,814 S | 6/2004 | Kim |
| 6,744,634 B2 | 6/2004 | Yen |
| 6,773,280 B2 | 8/2004 | Sasaki et al. |
| 6,783,060 B2 | 8/2004 | Marappan |
| 6,808,424 B2 | 10/2004 | Kaneshiro et al. |
| 6,824,066 B2 | 11/2004 | Weyant |
| 6,858,925 B2 | 2/2005 | Wada et al. |
| 6,865,086 B2 | 3/2005 | Gochnour et al. |
| 6,900,988 B2 | 5/2005 | Yen |
| 6,908,038 B1 | 6/2005 | Le |
| 6,970,359 B2 | 11/2005 | Gochnour et al. |
| 6,994,263 B2 | 2/2006 | Ueda et al. |
| 7,004,794 B2 | 2/2006 | Wang et al. |
| D518,483 S | 4/2006 | Yu et al. |
| 7,025,623 B2 | 4/2006 | Katsumata et al. |
| 7,040,919 B2 | 5/2006 | Yao |
| 7,083,107 B2 | 8/2006 | Sakamoto et al. |
| 7,102,891 B1 | 9/2006 | Miks et al. |
| 7,104,809 B1 | 9/2006 | Huang |
| D532,788 S | 11/2006 | Cuellar et al. |
| D542,797 S | 5/2007 | Cuellar et al. |
| 7,218,528 B2 | 5/2007 | Chen |
| D545,311 S | 6/2007 | Wai |
| 7,233,499 B2 | 6/2007 | Yu et al. |
| 7,269,004 B1 | 9/2007 | Ni et al. |
| D553,130 S | 10/2007 | Fiorentino et al. |
| 7,334,725 B2 | 2/2008 | Dan |
| 7,340,540 B2 | 3/2008 | Miller et al. |
| 7,344,072 B2 | 3/2008 | Gonzalez et al. |
| D565,572 S | 4/2008 | Yang |
| 7,355,860 B2 | 4/2008 | Miller et al. |
| 7,357,655 B1 | 4/2008 | Van der Steen |
| 7,364,090 B2 | 4/2008 | Cuellar et al. |
| 7,377,448 B2 | 5/2008 | Dan et al. |
| 7,392,358 B2 | 6/2008 | Chen et al. |
| 7,434,739 B2 | 10/2008 | Matsuura et al. |
| D591,753 S | 5/2009 | Nakano et al. |
| 7,537,169 B2 | 5/2009 | Gonzalez et al. |
| D612,385 S | 3/2010 | Aoki |
| 7,721,956 B2 | 5/2010 | Williams et al. |
| 2002/0036236 A1 | 3/2002 | Kondo et al. |
| 2002/0074415 A1 | 6/2002 | Kondo et al. |
| 2002/0084332 A1 | 7/2002 | Kondo et al. |
| 2002/0116668 A1 | 8/2002 | Chhor et al. |
| 2003/0081388 A1 | 5/2003 | Yang |
| 2003/0109179 A1 | 6/2003 | Kaneshiro et al. |
| 2004/0070952 A1 | 4/2004 | Higuchi et al. |
| 2004/0087213 A1 | 5/2004 | Kao |
| 2004/0089717 A1 | 5/2004 | Harari et al. |
| 2004/0089724 A1 | 5/2004 | Lasch et al. |
| 2004/0188531 A1 | 9/2004 | Gengel et al. |
| 2005/0077164 A1 | 4/2005 | Dhers |
| 2006/0098485 A1 | 5/2006 | Leenders et al. |
| 2006/0118639 A1 | 6/2006 | Kean et al. |
| 2006/0154525 A1 | 7/2006 | Bychkov et al. |
| 2006/0180674 A1 | 8/2006 | Margalit et al. |
| 2006/0181716 A1 | 8/2006 | Hoshina |
| 2006/0255158 A1 | 11/2006 | Margalit et al. |
| 2006/0273154 A1 | 12/2006 | Dan |
| 2006/0278723 A1 | 12/2006 | Dan et al. |
| 2006/0288169 A1 | 12/2006 | Steiner |
| 2007/0028046 A1 | 2/2007 | Pham |
| 2007/0099511 A1 | 5/2007 | Miller et al. |
| 2007/0153565 A1 | 7/2007 | Nomura et al. |
| 2007/0243769 A1 | 10/2007 | Atsmon et al. |
| 2007/0252010 A1 | 11/2007 | Gonzalez et al. |
| 2008/0087731 A1 | 4/2008 | Gonzalez et al. |
| 2008/0109309 A1 | 5/2008 | Landau et al. |
| 2008/0224320 A1 | 9/2008 | Palmade et al. |
| 2008/0239406 A1 | 10/2008 | Nakano |
| 2008/0294991 A1* | 11/2008 | Wong et al. .................. 715/719 |
| 2008/0299788 A1 | 12/2008 | Balchaytis |
| 2009/0009829 A1 | 1/2009 | Katsuyama |
| 2009/0014522 A1 | 1/2009 | Harris et al. |
| 2009/0063755 A1 | 3/2009 | Perng et al. |
| 2010/0218021 A1 | 8/2010 | Ma et al. |
| 2010/0289844 A1 | 11/2010 | Seibt |

FOREIGN PATENT DOCUMENTS

| | | |
|---|---|---|
| EP | 098227309 | 5/2012 |
| WO | PCT/US2009/061725 | 4/2001 |
| WO | WO 2005/124932 A2 | 12/2005 |
| WO | WO 2008/020442 | 2/2008 |
| WO | WO 2008/036537 | 3/2008 |
| WO | PCT/US2009/061725 | 6/2010 |
| WO | PCT/US2011/031432 | 12/2011 |
| WO | PCT/US2011/031473 | 12/2011 |
| WO | PCT/US2011/031645 | 12/2011 |
| WO | PCT/US2011/031646 | 12/2011 |
| WO | PCT/US2011/031432 | 10/2012 |
| WO | PCT/US2011/031473 | 10/2012 |
| WO | PCT/US2011/031645 | 10/2012 |
| WO | PCT/US2011/031646 | 10/2012 |

OTHER PUBLICATIONS

Website—www.minicdwizard; 2000; 1 p.
"Unversal Serial Bus Specification Revision 2.0"; Figure 6.9; pp. 99; Feb. 1998.

* cited by examiner

ELECTRONIC STORAGE DEVICES, PROGRAMMING METHODS, AND DEVICE MANUFACTURING METHODS

RELATED PATENT DATA

This application claims the benefit of, and claims priority to, U.S. Provisional Patent Application Ser. No. 61/321,779 filed Apr. 7, 2010, which is incorporated herein by reference. This application claims the benefit of, and claims priority to, U.S. Provisional Patent Application Ser. No. 61/321,801 filed Apr. 7, 2010, which is incorporated herein by reference. Furthermore, this application claims priority to and is a continuation in part of U.S. application Ser. No. 12/604,300 filed Oct. 22, 2009 now U.S. Pat. No. 8,047,443, which is incorporated herein by reference. This application also claims priority to and is a continuation in part of U.S. patent application Ser. No. 13/080,830 filed Apr. 6, 2011, which is incorporated herein by reference.

TECHNICAL FIELD

The present disclosure, in various embodiments, relates to electronic storage devices, programming methods, and device manufacturing methods.

BACKGROUND OF THE INVENTION

Paper does not lend itself very well to the storage of digital data. Up until now, paper has only stored digital data non-electronically, by way of characters or symbols printed on the paper with traditional ink representing data (e.g., a bar code printed on a piece of paper or a box. By digital standards, this is a low resolution, two-dimensional array of bits that it is difficult to read or write without sophisticated equipment and technology such as printers, scanners, optical character recognition devices, etc. Typically, traditional paper can only be written on (e.g., printed on) once, and thus data stored by traditional paper is not re-writable. One can forget about random access, high-speed data transfer rates, and other such data related conveniences we have come to expect with the electronic digital storage and retrieval of information provided by devices such as electronic memory, computer hard drives, flash memory, etc.

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

Paper has been used for millennia to share information. Some of its core features are: it is tangible, versatile, inexpensive to the point of disposability, easily transportable, subject-able to various transformations (cutting, folding, bending, binding, etc.) without losing its basic function, and it has a long shelf life. Consequently, paper has become ubiquitous and indispensable.

How indispensable, is easily seen by comparing the paperless promise of the digital age, and the reality we see in the world around us. Far from becoming obsolete, it seems uses for paper continue to multiply, notwithstanding the advance of technology. Our fundamental love affair with paper is simply not going away any time soon.

The current invention includes a way of marrying electronic digital information with paper, or other similar substrates, in a way that overcomes many of the limitations of paper described herein. Combining paper media, electronic data storage circuitry, electronic logic circuitry, and electronic processing circuitry into a homogeneous and inseparable whole, results in a breakthrough that is greater than the sum of its individual parts-intelligent Paper or intelliPaper™.

The resulting intelliPaper™, looks like traditional paper, feels like traditional paper, behaves and has the physical properties of traditional paper, but has additional properties unique to the invention, creating use cases that are not possible with traditional paper.

For example, a printed document using intelliPaper™ could not only have the text of the document conventionally printed on its surface with conventional ink, but may also include electronic circuitry embedded in the fibers of the intelliPaper that stores electronic digital data including an electronic digital version of the document. The electronic digital data may also contain other data related or unrelated to the document such as, for example, music, video, or other content related to the paper that might not be printed on the paper. In many cases, it might not be possible to print such other data on the surface of the intelliPaper using conventional printing methods because the intelliPaper might not have enough surface area or because conventionally printed characters or symbols might not be able to convey the data meaningfully, as in the case of audio or video. Furthermore, the electronic digital data may include metadata describing the document conventionally printed on the surface of the intelliPaper. Such metadata may include the date the document was printed, the location in which the document was printed, a name of a person who authored or printed the document, a digital signature, etc.

Central to the invention is the dual nature of the intelliPaper™ media. It is paper in every traditional sense since it may be written on, folded, printed on, bound into books, glued, stapled, etc., but it also carries with it digital content, and tools (e.g., electronic storage circuitry, software, firmware, drivers, electronic communication circuitry, etc.) used to quickly retrieve and/or reprogram it, thus enhancing intelliPaper™'s use far beyond traditional paper. Depending on the embodiment, intelliPaper™ may be indistinguishable from typical paper products (e.g., you won't necessarily be able to tell an intelliPaper™ business card apart from a conventional paper business card).

In fact, in some embodiments, intelliPaper may be creased, stapled, folded, flexed, and otherwise handled without compromising data stored by the intelliPaper or its ability to store data in the future. In such embodiments, the intelliPaper may include circuitry and/or software used to redundantly store data. If a portion of the electronic data storage circuitry of the intelliPaper is damaged, for example by a staple, data stored by that portion may be recovered or recreated using redundant data stored elsewhere in the electronic data storage circuitry or by using other known data redundancy, error correcting, and/or self-healing techniques.

Other attempts have been made to marry digital content with paper or other like substrates/media. One dimensional, and two dimensional bar codes are examples of this. RFID is also another limited purpose example of a similar concept, in which a digital identifier, along with (in some cases) a few bits of arbitrary data, is embedded into paper-like substrates.

intelliPaper™ is different and innovates over these other attempts in at least the following key ways:
1. Whereas, existing ideas have been able to incorporate small amounts of memory into paper-like substrates, intelliPaper™ incorporates large quantities of memory into paper (e.g., megabytes and/or gigabytes).
2. intelliPaper™ incorporates electronic communication busses, and microprocessing technology (unavailable in any current implementation) allowing the electronic circuitry embedded in intelliPaper to perform sophisticated processing including, encryption, compression, digital signatures, USB protocols and timing support, the use of busses, and other advanced data transfer and manipulation technologies. Such processing may result from instructions stored by the intelliPaper and executed by the electronic circuitry of the intelliPaper (e.g., firmware, software, etc.).
3. intelliPaper™ by nature has the same look and feel as traditional paper media. It is disposable, semi-durable, inexpensive, can be written on printed on, etc., and depending on the embodiment, may be flexed, bent, stapled and/or folded.
4. intelliPaper™ is user programmable, which is different from RFID to some degree because an RFID can only be programmed with an identification code, not with arbitrary information such as text, music, video, or other data.
5. The electronic circuitry of intelliPaper is an integral part of the paper media portion of intelliPaper. They are not separable. Destroy one, and you destroy the other. The electronic circuitry might not be visible or otherwise detectable by the human eye. Furthermore, the electronic circuitry may be spread throughout up to 90% of the area of the paper media portion.
6. The functionality of the paper media is preserved as it is commonly understood.

The invention's circuitry needs to be powered to read data from and/or write data to it. Depending on the embodiment, this power may be supplied by one or more of the following methods:
1. By body heat or friction supplied by the person holding the invention
2. Wirelessly via a magnetic field, an electric field, or an electromagnetic field
3. By the conversion of incident light to electricity within the invention
4. By physical contact with a power source as in traditional electronic devices
5. By mechanical bending, deformation, or vibration of the invention to create electricity via piezoelectric effects
6. By tapping electricity stored chemically, or capacitively in "batteries" incorporated into the invention during manufacturing
7. By a combination of any of the above methods Producing intelliPaper™ intelliPaper™ may be produced during the paper formation process, by embedding in the paper fibers electrically active materials (conductive, resistive, dielectric, capacitive, inductive, etc.) in such a way as to create electronic components we are more traditionally familiar with (transistors, resistors, capacitors, inductors, traces, etc.). These components may be interconnected during their formation, to create higher-level functions (logic, gates, memory, busses, processors, etc.), thereby creating electronic circuitry suitable for the storage and retrieval of digital information.

Figure 1:
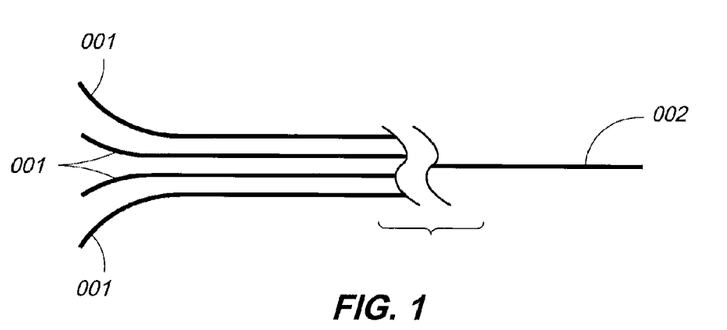
FIG. 1 is a partially exploded view of an electronic storage device in accordance with an embodiment.

Referring to FIG. 1, one embodiment of the invention may involve laminating together various substrate layers 001, on the surface of which have been printed electrical components using electrically active inks of various sorts. The substrate layers may comprise paper, cardboard, synthetic paper, plastic films, or other materials suitable for printing. In the case of paper substrates 001, the resulting laminated stock 002 would, when finished, be indistinguishable from common paper of similar thickness that had not been processed in this method. The electronic circuitry might not add significant thickness or bulk to the finished product. As a result, the finished product might not have bumps resulting from the electronic circuitry and may be substantially planar.

Figure 2:
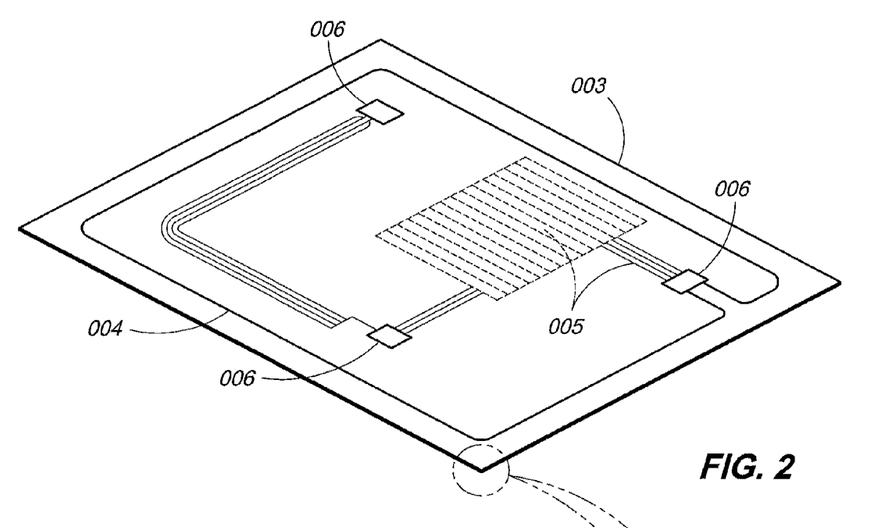
FIG. 2 is a perspective view of a schematic representation of an electronic storage device in accordance with an embodiment.

Referring to FIG. 2, In another embodiment of the invention, a sheet of intelliPaper™ 003 might be composed of one or more layers of paper substrate 007 into which has been laminated a combination of standard silicon chips 006 and other printed electronic components 004 005 (e.g., memory, busses, communication circuitry, antenna, etc.), each of the various components performing some function of the whole. The lamination may be accomplished such that the individual components are hidden from the user, who would perceive a simple homogenous sheet of intelliPaper™ indistinguishable from common paper having the similar size and thickness.

Figure 4:
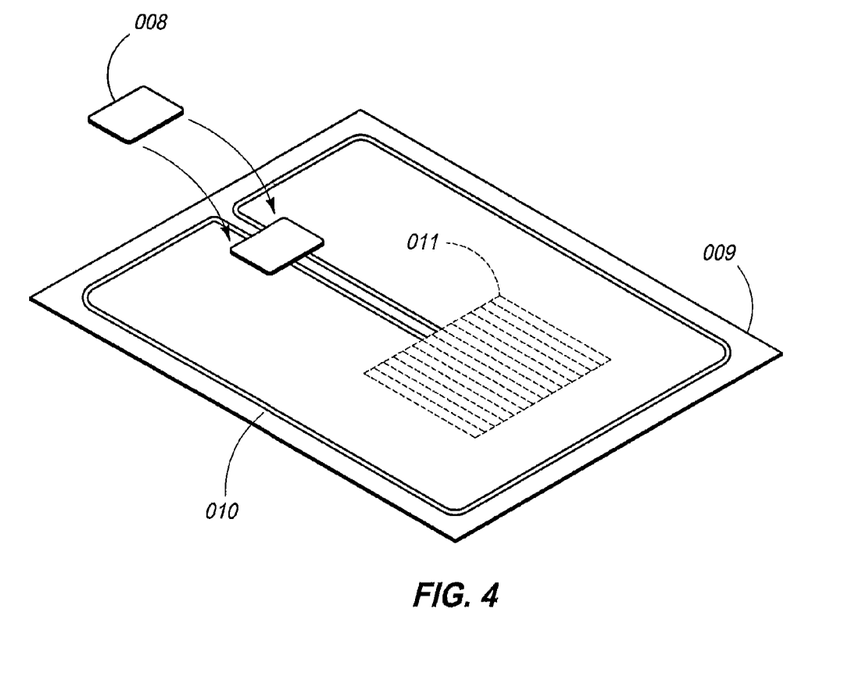
FIG. 4 is a perspective view of a schematic representation of an electronic storage device in accordance with an embodiment.

Referring to FIG. 4, in another embodiment of the invention, a pre-produced super-thin wafer containing some electronic circuitry 008 could be laminated into a sheet of intelliPaper 009, and interconnected with other printed electronic circuitry (such as communications circuitry 010 or memory 011). Again, as before, the finished product may be indistinguishable from common paper having the same size and thickness.

Example embodiments of intelliPaper are described more fully in U.S. patent application Ser. No. 12/604,300, which is incorporated herein by reference.

Programming intelliPaper™

It is possible to program electronic data storage circuitry of intelliPaper™ by a variety of means.

Figure 3:
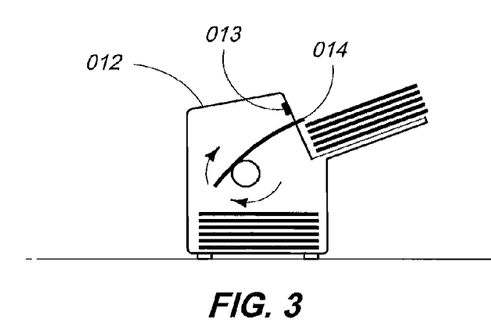
FIG. 3 is a schematic diagram illustrating a programming device in accordance with an embodiment.

In one embodiment, intelliPaper 014 may be programmed as it exits a printer 012 by a special programming head 013 under/over/through which the intelliPaper passes. The transfer of data between the head and the electronic circuitry of the intelliPaper could happen via physical electrical contact, or wirelessly by means of, light, electric fields, magnetic fields, or electro-magnetic fields.

In another embodiment, intelliPaper could be programmed by physical contact with a programming device such as those described in U.S. provisional patent application No. 61/321,238, which is incorporated herein by reference.

Figure 5:
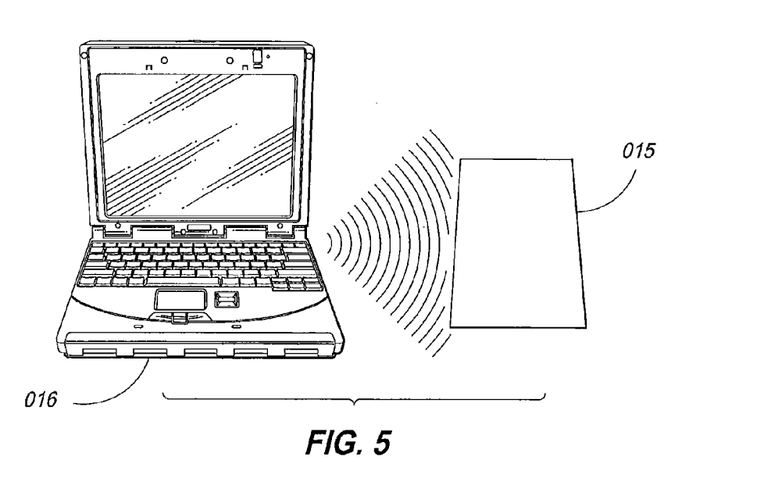
FIG. 5 is a block diagram depicting a system for programming an electronic storage device in accordance with an embodiment.

In yet another embodiment, intelliPaper 015 could be programmed when proximate to a computer 016, or other suitably equipped device, wirelessly over Bluetooth, or some other suitable wireless communications protocol. In this embodiment, the intelliPaper may include wireless communications circuitry.

In yet another embodiment, intelliPaper could be programmed optically with laser, or incident light into which has been encoded with the data to be stored. In one example light could pulse modulated to encode the information. In another, the light could be frequency modulated. In these examples, the intelliPaper™ would contain circuitry to demodulate the light, decode the data, and store it in the electronic data storage circuitry. In another example, the light could program individual memory cells of the electronic data storage circuitry directly by storing or removing an electric charge in individual memory cells, or by creating invisible pits or holes as in a CD that can then be electronically sensed or read. In this embodiment, the light may be precisely positioned to be directly proximate one memory cell of the electronic data storage circuitry at a time to program the one memory cell without unintentionally programming neighboring memory cells of the electronic data storage circuitry. Many combinations or embodiments are possible depending on the features desired.

In yet another embodiment, multiple memory cells of the electronic data storage circuitry of the intelliPaper may be programmed in parallel (e.g., substantially simultaneously), rather than serially, by a suitably configured, two-dimensional array of light beams positioned in proximity to the electronic data storage circuitry. In this case, the individual light beams may be aligned with individual memory cells of the electronic data storage circuitry. Charge is then placed or dissipated, via the light beams, in individual memory cells of the electronic circuitry of the intelliPaper by the incident light configuring each to a memory cell to store a 1 or a 0 in a manner similar to how an EPROM is erased with UV light, resetting every memory cell to a known value, by supplying energy (light) to break through the negative electrons blocking the floating gate in each memory cell.

In yet another embodiment, intelliPaper could be programmed by a suitably configured one-dimensional array of light beams scanned over its surface. This could work similarly to the two-dimensional light programming process explained above, but might program only a row of memory cells of the electronic data storage circuitry at a time, rather than programming all of the memory cells of the electronic data storage circuitry or a large portion of the memory cells of the electronic data storage circuitry in parallel.

In yet another embodiment, multiple memory cells of the electronic data storage circuitry of the intelliPaper may be programmed in parallel rather than serially, by a suitably configured, two-dimensional array of electrical, magnetic, or electro-magnetic fields positioned proximate to the electronic data storage circuitry of the intelliPaper so that individual of the fields are aligned with individual memory cells of the electronic data storage circuitry. The fields could add or remove charge to individual memory cells, or flip magnetic domains in individual memory cells, or a combination of the above, to accomplish the arbitrary configuration of the memory array with the data desired.

In yet another embodiment, intelliPaper could be programmed by a suitably configured one-dimensional array of electrical, magnetic, or electro-magnetic fields scanned over its surface. This could work similarly to the two-dimensional field programming process explained above, but might program only a row of memory cells of the electronic data storage circuitry at a time, rather than programming all of the memory cells of the electronic data storage circuitry or a large portion of the memory cells of the electronic data storage circuitry in parallel.

Reading intelliPaper™

It is also possible to read the data stored by intelliPaper™ by many of the same means described above under "programming intelliPaper."

The embodiments of intelliPaper described above may more generally be referred to as electronic storage devices. In one embodiment, an electronic storage device includes one or more substrates, storage circuitry configured to store electronic data, and communication circuitry configured to receive the electronic data from a programming device and provide the electronic data to the storage circuitry. The storage circuitry and communication circuitry are embedded in and are in direct physical contact with the one or more substrates.

Figure 6A:
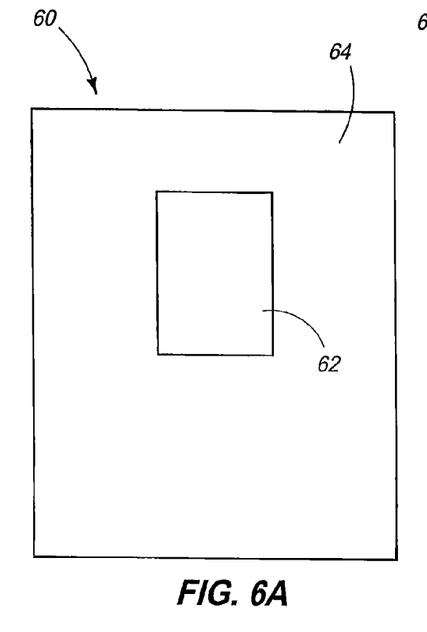
FIG. 6a is a top view of a portion of an electronic device in accordance with an embodiment.
Figure 6B:
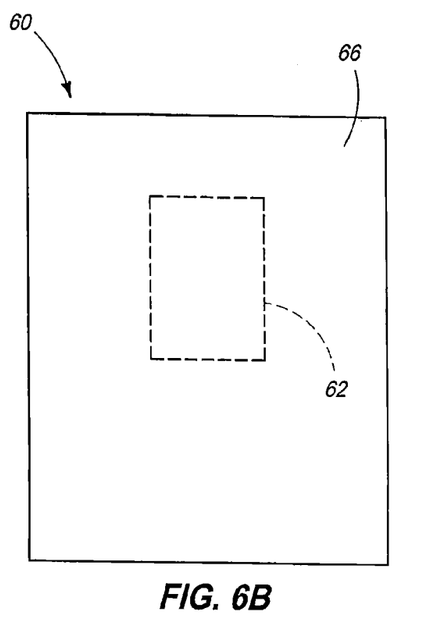
FIG. 6b is a top view of an electronic device in accordance with an embodiment.
Figure 6C:
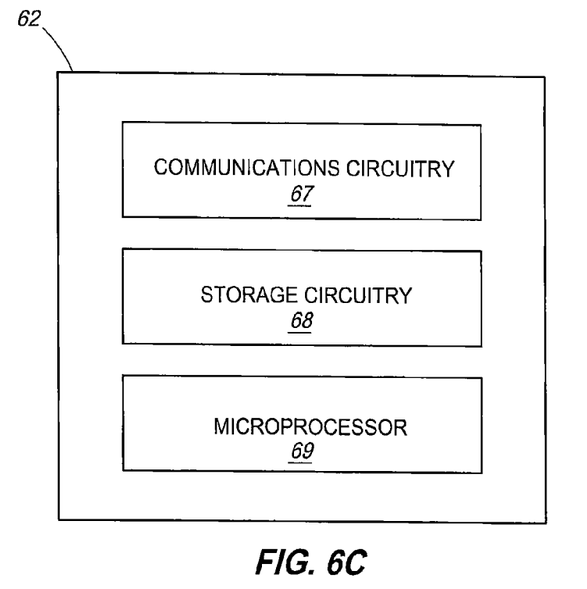
FIG. 6c is a block diagram of circuitry in accordance with an embodiment.

Such an embodiment is illustrated in FIGS. 6a and 6b. In FIG. 6a, an electronic storage device 60 includes circuitry 62 attached to substrate 64, which may be, for example, a sheet of paper. As illustrated in FIG. 6c, circuitry 62 may include communication circuitry 67, storage circuitry 68, and in some embodiments may include microprocessor 69. As illustrated in FIG. 6b, a second substrate 66 is attached to substrate 64, thereby covering circuitry 62. In one embodiment, substrate 66 may be a sheet of paper and substrate 66 and substrate 64 may be laminated or otherwise attached together to form a single laminated sheet. Note that substrates 64 and 66 may have substantially the same dimensions before and/or after they are attached together.

In one embodiment, circuitry 62 may be printed directly onto substrate 64 by a standard print head using electrically conductive ink. Accordingly, circuitry 62 may be in direct physical contact with substrate 64 and may also be in direct physical contact with substrate 66 when substrates 64 and 66 are attached together. In another embodiment, circuitry 62 may be an integrated circuitry chip or wafer (as was described above) attached to substrate 64 and put in direct physical contact with substrate 66 when substrates 64 and 66 are attached to each other.

More specifically, the storage circuitry may comprise a semiconductor chip, memory cells formed from electrically conductive ink printed on at least one of the one or more substrates, or a combination of both. Similarly, the communication circuitry may comprise a semiconductor chip, logic formed from electrically conductive ink printed on at least one of the one or more substrates, or a combination of both.

Regardless of the form of circuitry 62, once substrates 64 and 66 are attached to each other, circuitry 62 may be embedded in substrates 64 and 66, may be between substrates 64 and 66, and may be generally inaccessible and not visible to a user of device 60.

In one embodiment, the one or more substrates of the device are substantially planar pieces of paper. Further, the storage circuitry and the communication circuitry may be in direct physical contact with the one or more substantially planar pieces of paper.

In fact, device 60 may be visually indistinguishable from a piece of paper having the same dimensions as device 60. The substrates may have the width and height of a standard letter-sized piece of paper (e.g., 8.5 inches×11 inches) or may be sized according to other standard paper sizes so as to be convenient to a user and compatible with typical paper processing device such as printers. The electronic storage device may be flexible and/or may be foldable.

As was mentioned above, microprocessor 69 may be embedded in the one or more substrates. The microprocessor may execute program instructions stored in the storage circuitry. The microprocessor may perform a variety of functions. For example, the microprocessor may compress data received by the communication circuitry and store the compressed data in the storage circuitry. The microprocessor decompresses data stored by the storage circuitry and send the decompressed data to the communication circuitry, which may communicate the decompressed data to a device external to the electronic storage device.

Further, the microprocessor may encrypt data received by the communication circuitry and store the encrypted data in the storage circuitry. Additionally or alternatively, the microprocessor may verify a digital signature received by the communication circuitry.

The communication circuitry may transmit data to and receive data from the device external to the electronic storage device using the Universal Serial Bus (USB) protocol.

In one embodiment, the storage circuitry may have a capacity of at least one megabyte or at least one gigabyte. This amount may seem small compared to a typical USB thumb drive based on an integrated circuitry containing flash memory. However, the amount may be very large considering the state of the art with respect to electronics printed directly on a substrate using a variety of electrically conductive and/or electrically active inks. Furthermore, the amount may be an order of magnitude or more larger than the amount of memory of a typical RFID tag. In some applications, the storage circuitry need not be large and may have a capacity of far less than one megabyte. For example, a memory capacity needed to store an electronic version of text printed on one or both sides of a substrate may be far less than one megabyte.

Indeed, the storage circuitry may be spread across a majority or more of the substrate when the storage circuitry is printed directly on the substrate. In one embodiment, if the device was divided into ten different equal-sized portions, portions of the storage circuitry would be present in each of the ten different equal-sized portions.

The storage circuitry may store an arbitrary mixture of binary values and may represent substantially any form of data, for example, test, pictures, video, database entries, program instructions, etc. The storage circuitry is non-volatile, meaning that it may retain data stored in the storage circuitry for extended periods of time (e.g., days, weeks, or months) without consuming power.

Writing data to the storage circuitry and reading data from the storage circuitry may, of course, consume power. The storage circuitry may consume electrical power supplied by one or more of body heat of a person holding the device, friction between the person holding the device and the device, a magnetic field, an electric field, an electromagnetic field, light incident on the device, physical contact with an electrical power source, piezoelectric effects resulting from deformation or vibration of the device, or a battery embedded in the one or more substrates. Other power supplies may also be possible.

The electronic storage device may be configured to be printed by a printer without damaging the storage circuitry or the communication circuitry or disturbing electronic data stored by the storage circuitry. For example, device 60 may routinely be fed through a standard printer used with a computer such as laser printer or ink jet printer without damage or data loss. Furthermore, device 60 may be routinely fed through a commercial printing system such as those used to print books, magazines, and newspapers without damage or data loss. To prevent damage and data loss, the electronic storage device, in one embodiment, may be flexible enough to pass over, around, and through various rollers and to be curved in a semi-circle having a radius of two inches or more.

Some properties of device 60 that may enable device 60 to be fed through such printers without damaging circuitry 62 are its thickness and its flexibility. Furthermore, circuitry 62 may be configured to withstand heat generated by fusing mechanisms or other heat generating parts of a printer without disturbing the electronic data stored by the storage circuitry.

In one embodiment, a surface of one of the substrates comprises printed text (e.g., human readable text as distinguished from machine readable bar codes) and the storage circuitry stores an electronic version (e.g., an electronic file) of the printed text. The text may be printed on an external surface of the substrate. For example, on the surface of substrate 66 facing away from circuitry 62 and/or on the surface of substrate 64 that faces away from circuitry 62. In one embodiment, the storage circuitry may store a word processing file containing the text and the text may be printed on substrate 66.

In addition to an electronic version of the printed text, the storage circuitry may store information about the electronic version of the printed text. For example, the storage circuitry may store a time when the printed text was printed, a location where the printed text was printed, a name of an author of the printed text, and/or a digital signature of the author of the printed text. Such information may enhance the value of device 60 over a standard piece of paper containing the printed text.

Figure 7:
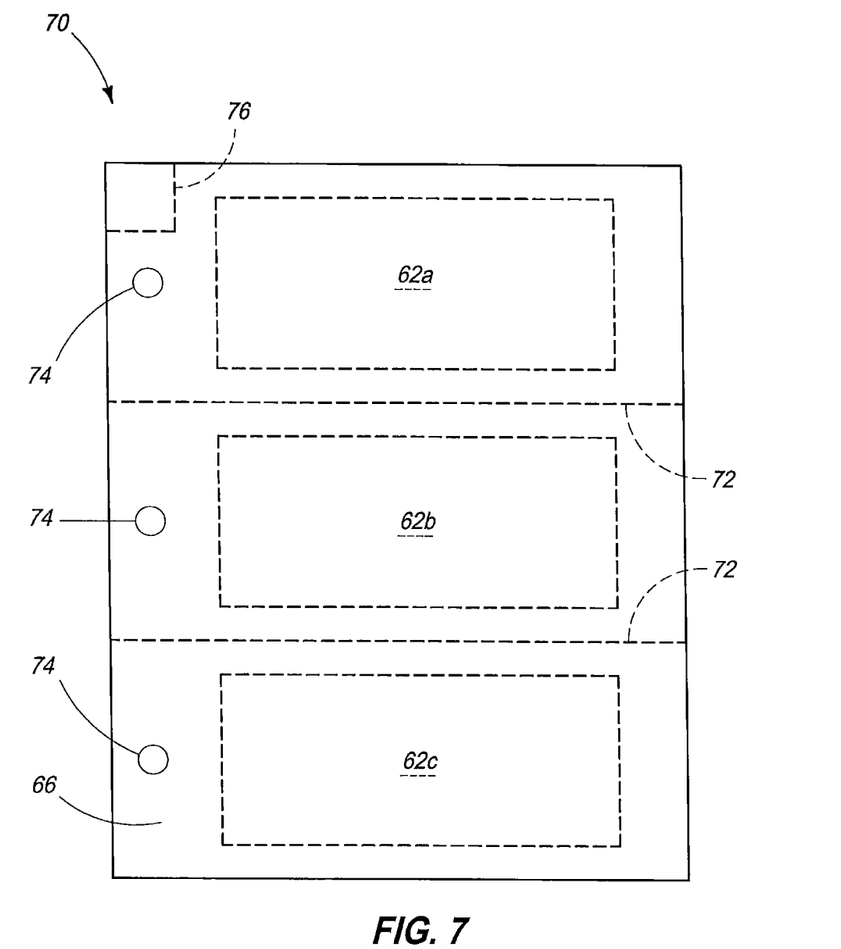
FIG. 7 is a top view of an electronic device in accordance with an embodiment.

In one embodiment, the storage circuitry comprises a plurality of storage circuitry modules, each module being configured to store data independent of the other modules of the plurality. Referring to FIG. 7, three different circuitry modules 62a, 62b, and 62c are illustrated. Each of the circuitry modules may comprise storage circuitry and/or communication circuitry. The modules may be independent from each other. For example, circuitry 62a may store data regardless of a state of circuitry 62b and may receive data from or send data to an external device (e.g., device 016) independent of circuitry 62b. Accordingly, circuitry 62a may comprise communication circuitry that acts independent of communication circuitry of circuitry 62b.

Alternatively, device 60 may have a single implementation of communication circuitry and storage circuitry of each module is configured to communicate with the communication circuitry. For example, communication circuitry may be present in circuitry 62a, but not circuitry 62b or 62c, and circuitry 62b and 62c may be electrically connected to the communication circuitry present in circuitry 62a.

In one embodiment, each storage circuitry module is configured to communicate with at least one of the other storage circuitry modules. Furthermore, each storage circuitry module may be configured to copy data stored by the storage circuitry module to one of the other storage circuitry modules. For example, circuitry 62a may copy data stored by circuitry 62a to circuitry 62b. Such copying may be done automatically in a manner transparent to a user of device 60.

In one embodiment, the storage circuitry stores at least two copies of the electronic data. For example, storage circuitry 68 may redundantly store two copies of the electronic data so that if one copy is compromised, for example, because a portion of the substrate corresponding to a portion of the storage circuitry storing the compromised copy is damaged (e.g., torn, stapled, punched, etc.), the other copy may be used. In another example, circuitry 62a may store one copy of the electronic data and circuitry 62b may store the other copy of the electronic data.

In one embodiment, the storage circuitry modules (e.g., storage circuitry 62, 62a, 62b, 62c) are positioned in the device away from common puncture locations of the one or more substrates. As illustrated in FIG. 7, such locations may include locations 74 which are typically punched by a standard three hole punch to enable device 60 to be inserted into a standard three ring binder. Such locations may also include a region 76 where staples are typically located. Accordingly, the common puncture locations may include a location commonly used for stapling the device to a piece of paper and locations commonly used for punching holes that receive rings of a binder.

Additionally or alternatively, the storage circuitry modules may be positioned in the device away from common fold locations of the one or more substrates. For example, fold locations 72 of FIG. 7, which are common fold locations for a letter-sized piece of paper used when folding the piece of paper for insertion into an envelope.

Figure 8:
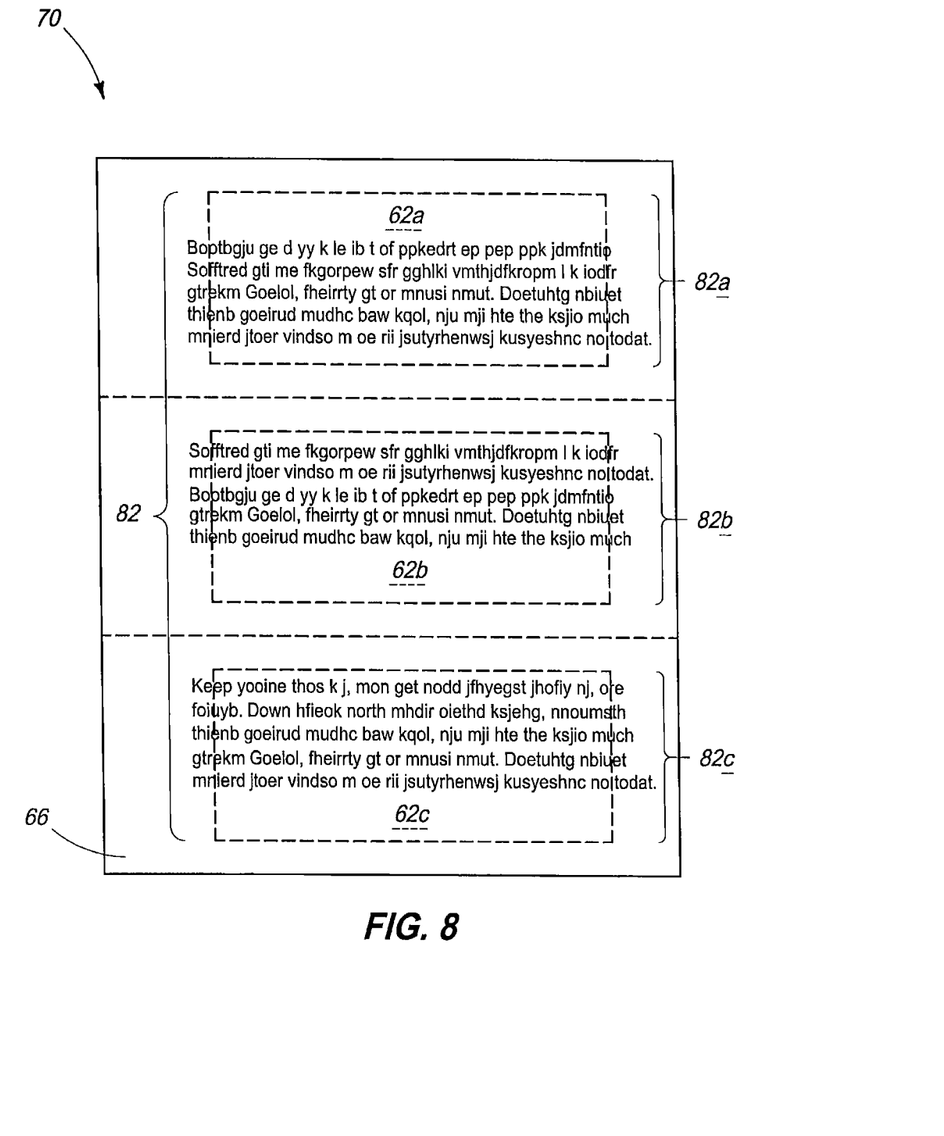
FIG. 8 is a top view of an electronic device in accordance with an embodiment.

Referring now to FIG. 8, an electronic storage device 80 having circuitry 62a, 62b, and 62c described above is illustrated. A front surface of substrate 66 of device 80 has been printed with text 82. In one embodiment, circuitry 62a stores an electronic version of a first portion 82a of text 82 located nearest circuitry 62a, circuitry 62b stores an electronic version of a second portion 82b of text 82 located nearest circuitry 62b, and circuitry 62c stores an electronic version of a third portion 82c of text 82 located nearest circuitry 62c. In general, each individual storage circuitry module is configured to store an electronic version of a portion of the printed text located nearest the individual storage circuitry module. Furthermore, in one embodiment, circuitry 62a may store the electronic version of the second portion 82b in addition to the electronic version of the first portion 82b so that if circuitry 62b is disabled (e.g., due to a cut or hole), the electronic version of the second portion 82b will still be available. In this manner, a storage circuitry module may store an electronic version of a portion of the printed text even if the portion is nearer a different storage circuitry module. Further, a storage circuitry module of a device may store an electronic version of text printed on the device that surrounds the storage circuitry module (e.g., within a predetermined radius) even though the printed text surrounding the storage circuitry module may be nearer a different storage circuitry module of the device. This feature may be useful even if none of the storage circuitry modules are disabled. For example, if device 70 is cut into thirds along fold lines 72, each of the thirds may store an electronic version of the entire printed text 82. This may be useful in recovering the entire printed text 82 even if only a third of device 70 is available.

Advantageously, the storage circuitry modules continue to store the electronic versions when the device is cut into two pieces. For example, if device 80 is cut in thirds with one third containing portion 82a, one third containing portion 82b, and one third containing portion 82c, the individual thirds remain functional. For example, the third containing portion 82a continues to store an electronic version of portion 82a despite being severed from the other two thirds. The third may communicate the electronic version of portion 82a to a device external to the third and may receive additional or different electronic data via circuitry 62a and store the additional or different electronic data in circuitry 62a.

In general, if device 80 is cut into two pieces, one of the two pieces comprises some of the storage circuitry modules and the other of the two pieces comprises the rest of the storage circuitry modules and continue to store the electronic versions of the printed text when the device is cut into two pieces. In other embodiments, the device may preserve its functionality when cut into more than two or three pieces.

Figure 9:
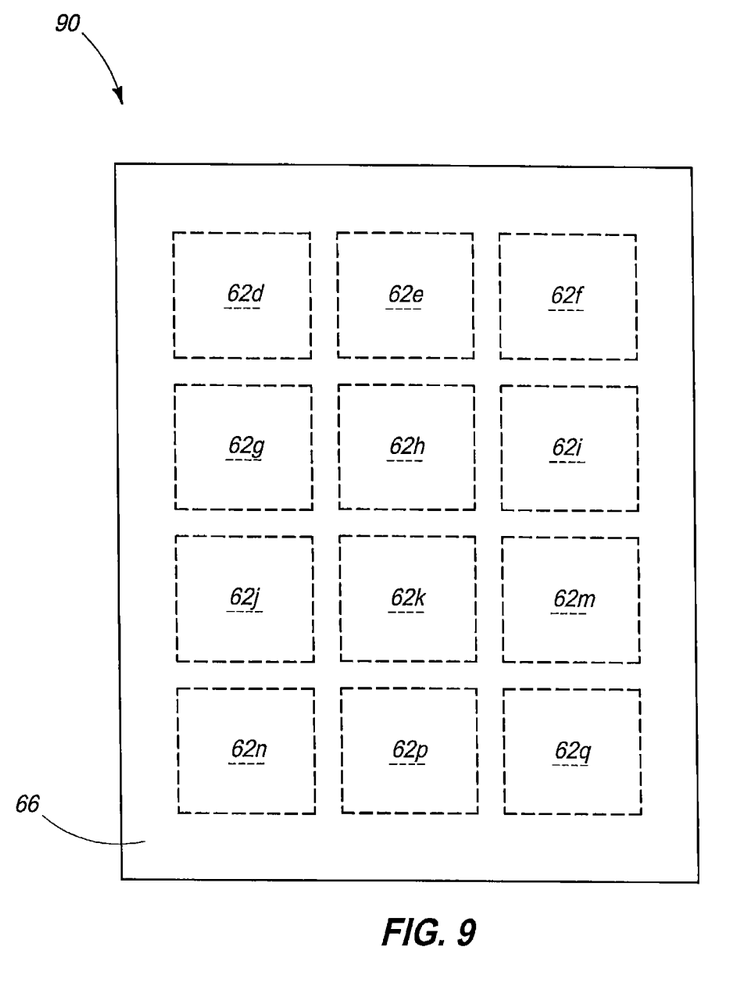
FIG. 9 is a top view of an electronic device in accordance with an embodiment.

Referring to FIG. 9, an electronic device 90 is illustrated that has twelve different circuitry modules 62d, 62e, 62f, 62g, 62h, 62i, 62j, 62k, 62m, 62n, 62p, and 62q. As with the circuitry modules described above, each of these circuitry modules may operate independent of the other circuitry modules and may store electronic data independent of the other circuitry modules.

Furthermore, each individual circuitry module of FIG. 9 may store an electronic version of a portion of text printed on the surface of substrate 66 of device 90 located nearest the individual storage circuitry module as was described above in relation to FIG. 8. Advantageously, device 90 may be cut into twelve different pieces with each piece retaining its ability to store electronic data, to receive and store new electronic data, and to communicate its stored electronic data to an external device (e.g., device 016).

Various methods may be used to program an electronic storage device (e.g., device 60, device 70, device 80, device 90, etc.). In one embodiment, a programming method includes providing an electronic storage device comprising storage circuitry configured to store electronic data and communication circuitry configured to receive the electronic data and provide the electronic data to the storage circuitry, the storage circuitry and communication circuitry being embedded in two or more substrates. The method further includes communicating the electronic data to the communication circuitry and storing the electronic data in the storage circuitry.

The method may further include printing text on a surface of one of the two or more substrates as was described above. The method may further include storing an electronic version of the printed text in the storage circuitry while the device is engaged by a printer (e.g., printer 012 of FIG. 3) that prints the text on the surface. By way of example, the device may be engaged by the printer when sitting in a tray of the printer or when being moved through the printer or when otherwise being positioned within or on the printer.

In some embodiments, the method includes storing an electronic version of the printed text in the storage circuitry during the printing of the text on the surface. In some embodiments, the method includes storing an electronic version of the printed text in the storage circuitry immediately before the printing of the text on the surface. In some embodiments, the method includes storing an electronic version of the printed text in the storage circuitry immediately after the printing of the text on the surface.

As was described above, in some embodiments, the storage circuitry comprises a plurality of storage circuitry modules, each module being configured to store data independent of the other modules of the plurality. In such embodiment, the method may further include storing the electronic data in a first one of the storage circuitry modules, redundantly storing the electronic data in a second one of the storage circuitry modules, receiving a request for the electronic data from a device, determining that the electronic data stored in the first one of the storage circuitry modules is defective, and communicating the electronic data stored in the second one of the storage circuitry modules to the requesting device.

According to one embodiment, a method for manufacturing an electronic storage device includes affixing storage circuitry configured to store electronic data and communication circuitry configured to receive the electronic data from a programming device to a first substrate and attaching a second substrate to the first substrate, the second substrate covering the storage circuitry and the communication circuitry.

The affixing may include printing electrically conductive ink on the first substrate to form at least a portion of the memory circuitry and printing electrically conductive ink on the first substrate to form at logic of the communication circuitry. As was described above, the first substrate may be a first substantially planar sheet of paper and the second substrate may be a second substantially planar sheet of paper.

In one embodiment, attaching the second substrate to the first substrate may include laminating the first substrate to the second substrate. In one embodiment, the storage circuitry may be a semiconductor chip and the affixing may include affixing the chip to the first substrate.

The invention claimed is:

1. An electronic storage device comprising:
one or more substrates;
storage circuitry configured to store electronic data;
communication circuitry configured to receive the electronic data from a programming device and provide the electronic data to the storage circuitry; and
wherein the storage circuitry and communication circuitry are embedded in and are in direct physical contact with the one or more substrates, wherein the device is configured to be printed by a printer without damaging the storage circuitry or the communication circuitry or disturbing electronic data stored by the storage circuitry.

2. The device of claim 1 wherein the one or more substrates comprise paper.

3. The device of claim 1 wherein the device is visually indistinguishable from a piece of paper having the same dimensions as the device.

4. The device of claim 1 wherein a surface of one of the substrates comprises printed text and the storage circuitry stores an electronic version of the printed text.

5. The device of claim 4 wherein the storage circuitry stores information about the electronic version of the printed text including one of a time when the printed text was printed, a location where the printed text was printed, a name of an author of the printed text, or a digital signature of the author of the printed text.

6. The device of claim 1 further comprising a microprocessor embedded in the one or more substrates, the microprocessor executing program instructions stored in the storage circuitry.

7. The device of claim 6 wherein the microprocessor compresses data received by the communication circuitry and stores the compressed data in the storage circuitry.

8. The device of claim 6 wherein the microprocessor verifies a digital signature received by the communication circuitry.

9. The device of claim 1 wherein the storage circuitry has a capacity of at least one megabyte.

10. The device of claim 1 wherein if the device was divided into ten different equal-sized portions, portions of the storage circuitry would be present in each of the ten different equal-sized portions.

11. The device of claim 1 wherein the storage circuitry consumes electrical power generated supplied by one or more of body heat of a person holding the device, friction between the person holding the device and the device, a magnetic field, an electric field, an electromagnetic field, light incident on the device, physical contact with an electrical power source, piezoelectric effects resulting from deformation or vibration of the device, or a battery embedded in the one or more substrates.

12. The device of claim 1 wherein the storage circuitry stores at least two copies of the electronic data.

13. The device of claim 1 wherein the storage circuitry comprises memory cells formed from electrically conductive ink printed on at least one of the one or more substrates.

14. An electronic storage device comprising:
one or more substrates;
storage circuitry configured to store electronic data;
communication circuitry configured to receive the electronic data from a programming device and provide the electronic data to the storage circuitry; and
wherein the storage circuitry and communication circuitry are embedded in and are in direct physical contact with the one or more substrates, wherein the storage circuitry comprises a plurality of storage circuitry modules, each module being configured to store data independent of the other modules of the plurality.

15. The device of claim 14 wherein a surface of one of the substrates comprises printed text and each individual storage circuitry module is configured to store an electronic version of a portion of the printed text located nearest the individual storage circuitry module.

16. The device of claim 15 wherein the storage circuitry modules continue to store the electronic versions when the device is cut into two pieces.

17. The device of claim 16 wherein one of the two pieces comprises some of the storage circuitry modules and the other of the two pieces comprises the rest of the storage circuitry modules.

18. The device of claim 14 wherein each storage circuitry module is configured to communicate with at least one of the other storage circuitry modules.

19. The device of claim 14 wherein the storage circuitry modules are positioned in the device away from common puncture locations of the one or more substrates.

20. The device of claim 19 wherein the common puncture locations include a location commonly used for stapling the device to a piece of paper and locations commonly used for punching holes that receive rings of a binder.

21. A programming method comprising:
providing an electronic storage device comprising storage circuitry configured to store electronic data and communication circuitry configured to receive the electronic data and provide the electronic data to the storage circuitry, the storage circuitry and communication circuitry being embedded in two or more substrates;
communicating the electronic data to the communication circuitry; and
storing the electronic data in the storage circuitry, further comprising printing text on a surface of one of the two or more substrates and storing an electronic version of the printed text in the storage circuitry while the device is engaged by a printer that prints the text on the surface.

* * * * *